Aug. 20, 1935.   H. S. KONHEIM ET AL   2,011,862
VISCOSIMETER
Filed March 22, 1930   2 Sheets-Sheet 1

INVENTORS
WALTER J. ALBERSHEIM AND
BY HARVEY S. KONHEIM
ATTORNEY

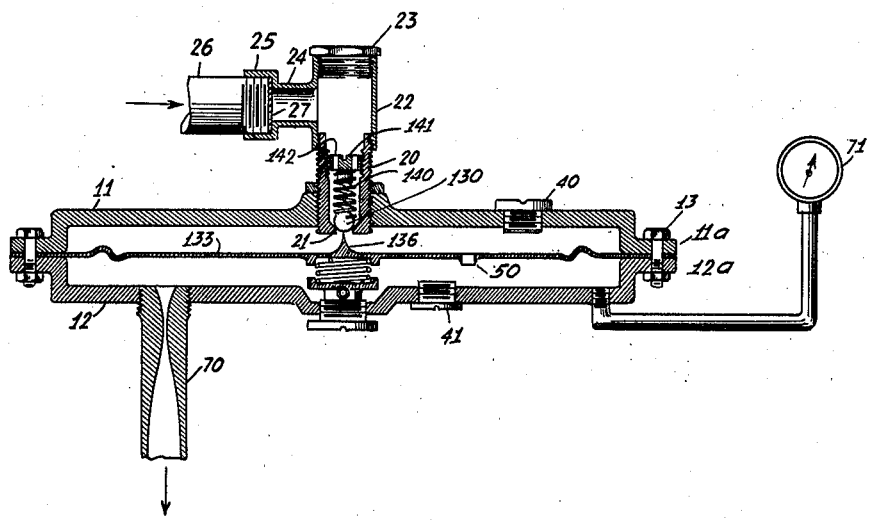
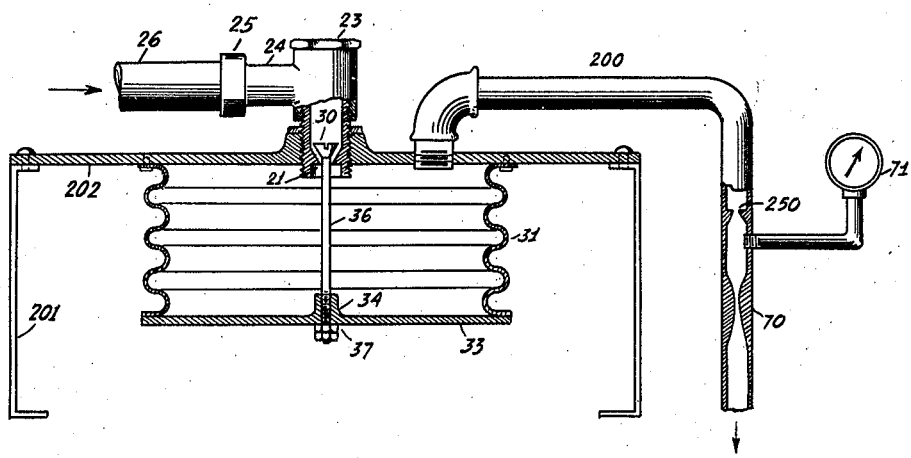

Patented Aug. 20, 1935

2,011,862

UNITED STATES PATENT OFFICE 2,011,862

VISCOSIMETER

Harvey S. Konheim and Walter J. Albersheim, New York, N. Y.

Application March 22, 1930, Serial No. 438,030

7 Claims. (Cl. 265—11)

In our prior Patent 1,958,878 of May 15, 1934, for Viscosity meter, of which this application is a continuation in part, we have disclosed direct reading viscosity meters. These meters employ, among other things, certain orifices and jets. We have determined both mathematically and experimentally that by using an orifice which has a substantially purely accelerating non-frictional coefficient in combination with a jet having a substantially purely frictional non-accelerating coefficient, we may obtain, directly upon our gauge, measurements of absolute viscosity which are proportional to pressure readings, and that the absolute viscosity is a straight line function of these pressure readings.

Further experimental and development work has taught us that in connection with the use of the devices disclosed in our said patent, in automobiles, for example, or use of the same in stationary engine installations, etc., a very wide viscosity range must be covered. For example, the viscosity of cold oil in winter is more than 20 times the allowable minimum viscosity prescribed by engine manufacturers. We therefore were faced with the problem of keeping the viscosity range within the limits of present day commercial gauges, and at the same time with the further problem of rendering the device sufficiently sensitive at the lower limit of viscosity. We have found that the upper limit of viscosity is not critical but still must be readable upon the gauge. Also, it must not be too high, for an excessive viscosity may prevent the oil from penetrating to the surfaces desired to be lubricated. At the lower limit of the useful range of the instrument the readings must be very sensitive, since a small change in viscosity indicates the difference between the operating range and the danger zone.

It is therefore an object of the present invention to so shape the orifice and jet used in our instrument that the pressure viscosity function departs by a predetermined amount from the straight line function, thus permitting the desired range of readings to be made by means of commercial pressure gauges, and at the same time permitting the desired sensitivity of readings at the different portions of the viscosity scale.

It is a further object of this invention to design the orifice and jet of our meter in such a way as to obtain a predetermined pressure viscosity characteristic.

Also, in the commercial use of instruments constructed in accordance with the disclosure of our previously mentioned patent, especially where such instruments are mounted upon a moving vehicle, we have found that the vibrations of the oil pump together with the general shaking of the viscosity meter causes undesirable fluctuations in the pressure readings. In addition, when the engine to which the device is applied is being started cold, the residual oil remaining in the viscosity meter and feed lines is generally colder than the oil being fed from the pump, so that during the first moments of operation the meter will tend to show wrong values of viscosity.

It is therefore a further object of this invention to provide the meter with a slightly delayed action for equalizing and damping fluctuations as explained above.

Again, for many industrial applications of the device of our copending application, the maximum and minimum values of viscosity are of prime interest while the intermediate readings are of secondary interest. For instance, in a certain installation the specification may be laid down that the oil is not to fall below a certain value of viscosity, neither is it to exceed a certain value; and it is only these two limiting values that are of interest to the user. It therefore becomes desirable, under these circumstances, to provide the meter with an arrangement for indicating and recording either visually or by sound when either one of the two limits permitted is reached.

It is therefore an object of this invention to provide a meter having indicating means which function only when certain limits of viscosity of the liquid being tested are reached.

Finally, we have found that in connection with the production of instruments of the aforesaid type in commercial quantities the method of calibrating and adjusting the elements of the meter is of great importance from the point of view of maintaining minimum manufacturing costs.

It is therefore another object of this invention to provide a meter with an adjustable valve seat, an adjustable valve stem, an adjustable spring tension means, together with tools for making the desired adjustments by calibrating the instrument.

These and other objects of the invention will be readily apparent to those skilled in the art from the following description taken in connection with the accompanying drawings in which:

Figs. 2 and 3 are sectional views of modifications of the device of Fig. 1;

Figure 1:
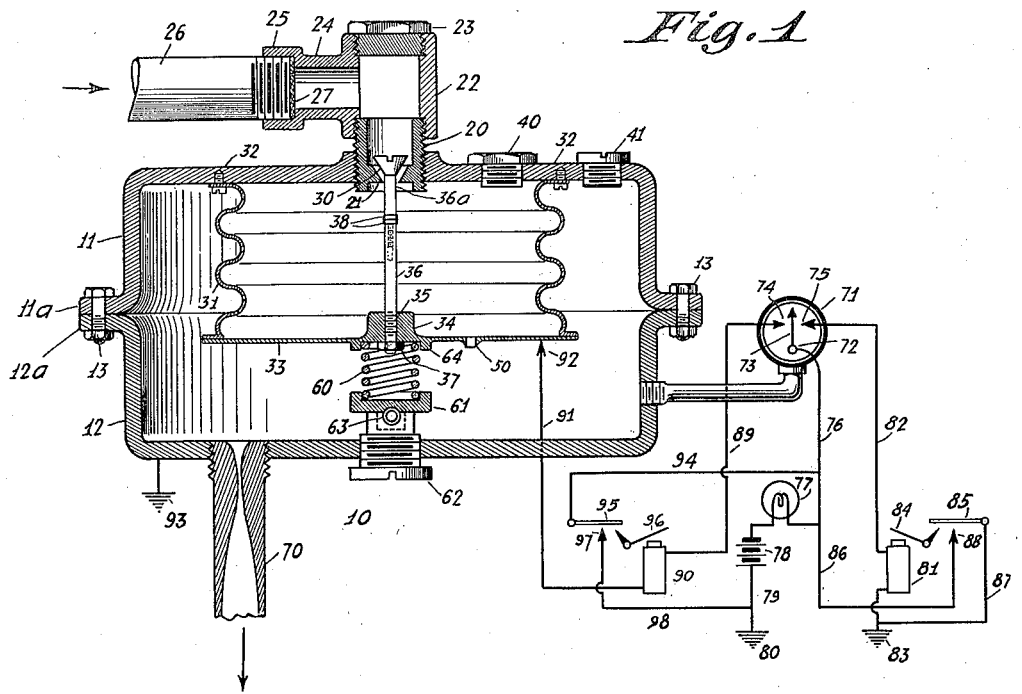
Fig. 1 is a sectional view of a device embodying the present invention and showing also the application of a maximum and minimum indicating device.

Referring in detail to the drawings, the meter 10 is seen to comprise an upper half section 11 having a flange 11a and a lower half section 12 having a flange 12a, both flanges extending circumferentially around the device and fitted together, whereby the two sections may be joined in airtight relationship, with or without the use of any suitable gasket, and held together by bolts 13 suitably spaced about the circumference of the instrument to form a casing. The top half section 11 is provided with an adjustable valve casing 20 which is mounted within the section 11 by screw threads and may be adjusted by screwing the member 20 upwardly or downwardly of the section, whereby to position the valve seat 21 at the desired position with respect to the valve head 30. Joined to the valve containing member 20 is a T section 22 having a screw cap 23 and an inlet connection 24. The inlet connection 24 is provided with an annular flange 25 internally threaded to receive the pipe 26, which pipe is connected to the source of the liquid to be tested. A screen 27 of any desirable fineness or mesh is held in place by the pipe 26 and the shoulder of the flange 25 thus serving as a means to remove sludge and other suspended matter which might be carried by the oil. It will be understood that the screen may be replaced by any other suitable filtering device.

Interiorly of the casing of the device 10 is mounted a bellows 31 which is joined to the upper section 11 by any suitable means such as bolts or screws 32 in an airtight relationship with the casing. The bottom plate 33 of the bellows is fitted with a stud 34 internally threaded at 35 to receive the valve stem 36. The nut 37 serves as a means to lock the stem 36 in position within the stud 34. It will be seen that the adjustment of the opening of the valve depends upon the space between the valve head 30 and the valve seat 21. Adjustment of this spacing may be made by screwing the valve stem 36 either upwardly or downwardly with respect to the stud 34 or alternatively the valve housing 20 may be screwed upwardly or downwardly in the casing 11. As an additional means of adjustment of the valve opening the valve stem 36 is provided with a top section 36a which is screw-threaded into the valve stem 36 and adjustment may therefore be made by screwing the section 36a either upwardly or downwardly with respect to the section 36. It will be understood, of course, that any suitable means may be provided for maintaining the section 36a in fixed relation with respect to the stem 36. A most convenient means is to insert washers or shims 38 of predetermined thickness between the section 36a and the stem 36 and then to screw down the section 36a upon this. A screw cap 40 communicates with the interior of the bellows thus permitting a gauge to be connected to this chamber if found desirable. Another screw cap 41 is connected in the upper section 11 exteriorly of the bellows. The plate 33 of the bellows is provided with an orifice 50 having a predetermined contour which will be discussed in more detail below.

In addition to the inherent elasticity of the bellows a helical spring 60 is disposed between the plate 33 and the pivotal support 61 which rests upon the screw cap 62 carried by the lower section 12. The member 61 is held in position with respect to the member 62 by a ball and socket construction 63. It will thus be seen that the tension upon the spring 60 may be conveniently adjusted by screwing the cap 62 into or out of the section 12 as desired. An annular ring 64 is carried by the plate 33 and serves as a means to hold the spring 60 in fixed relationship with respect to the plate.

Mounted in the lower section 12 is a jet 70 having the curved inner contour as shown in Figure 1. A pressure gauge 71 of any suitable commercial type is connected to the chamber surrounding the bellows.

The theory of operation of the foregoing device is fully set forth in our previously mentioned patent. This operation may be summarized briefly as follows: The liquid to be tested enters the instrument through the pipe 26, passes through the screen 27 and enters the interior of the bellows 31. The admission of the liquid into the interior of the bellows creates a pressure therein thus causing the bellows to be extended and the plate 33 to move downwardly against the tension of the walls of the bellows and also against the predetermined tension of the spring 60. It will be understood that the movement of the plate 33 actuates the valve head 30 thus controlling the flow of liquid into the bellows. The liquid passes from the interior of the bellows through the orifice 50 into the chamber surrounding the bellows, thus exerting a pressure on the under surface of the bellows which tends to counteract the inner pressure of the liquid within the bellows. By virtue of this arrangement we have found that the valve 30 is actuated in such a way as to maintain constant the speed of flow of the liquid out of the bellows through the orifice 50. The liquid is then made to pass from the chamber surrounding the bellows through the jet 70. Since the liquid is led to the jet at a constant speed we have found that the pressure reactions caused by the flow of liquid through the jet 70, and indicated on the gauge 71, measures directly the absolute viscosity of the liquid flowing; and in fact a commercial pressure gauge connected in this position may be accurately calibrated in units of viscosity.

Figure 4:
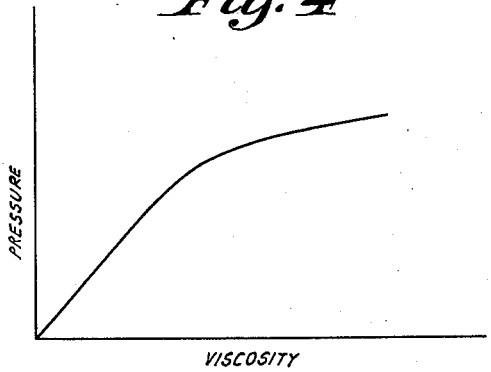
Fig. 4 is a diagram of the pressure viscosity characteristic.
Figure 5:
Figs. 5 and 6 are detailed views of orifices constructed in accordance with the principles of this invention.

As has already been set forth above, the readings on the pressure gauge are a straight line function of the absolute viscosity of the liquid flowing, providing we employ an orifice 50 which has a purely accelerative characteristic and providing also the jet 70 is contoured to offer predominantly frictional resistance to the flow of the liquid therethrough. We have found in practice that in order to make use of pressure gauges which are sufficiently sensitive at the lower pressure ranges, and yet which have the desired overall pressure range, it becomes desirable to alter the pressure viscosity response curve from a straight line to a curve having the general shape as shown in Fig. 4. In other words, the desired pressure viscosity characteristic is one which is substantially a straight line at the lower viscosity range, while for the higher viscosities, the curve is flattened out as shown. This desired result is attained by departing from our prior practice of shaping the orifice 50 to have a purely accelerative non-frictional characteristic and giving it a predetermined thickness as shown in Fig. 5. This additional thickness given to the orifice 50 introduces sufficient frictional resistance to the flow of liquid therethrough and thus serves to alter the response curve for higher viscosities from the straight line to the curve indicated in Fig. 4. The jet 70 is provided with the smooth curve as shown in Fig. 1 but offers substantially purely frictional resistance to the flow of liquid therethrough. We have found that a meter constructed in accordance with the principles of this invention gives highly sensitive viscosity readings at the lower range, where it is essential to have sensitive viscosity readings, whereas at the high viscosity range the response is not quite so sensitive although sensitive enough for all practical purposes. At the same time this arrangement permits the entire range of pressures to come within the range of gauges now commercially available.

The maximum and minimum viscosity indicating means will now be described.

The gauge 71 is provided with one terminal 72 to which the movable pointer 73 is connected and the minimum point 74 and maximum point 75 serve as two other electrical terminals. A lead 76 connects the terminal 72 to a signalling device 77, which may be either a lamp, a bell or any other suitable signalling device, through a battery 78 to the ground 80 through the lead 79. The maximum point terminal 75 is connected to the relay 81 by the lead 82 and the relay 81 is grounded at 83. The armature 84 of the relay, when pulled down, permits the movable contact 85 to connect the terminal 86 to the ground through lead 87. It will thus be seen that when the pointer 73 swings over to the terminal 75 the electrical circuit including the indicating device 77 is closed. This circuit may be traced as follows. Starting at the ground 80 we follow through the lead 79, the battery 78, the indicating device 77, the lead 76, the pointer 73, the lead 82, the relay 81, back to the ground at 83. The circuit of the indicating device is thus maintained closed as long as the pointer 73 remains in contact with the terminal 75. It has been found desirable to provide a mechanism for maintaining the signalling device operative once the maximum value has been attained, even though subsequently the value of viscosity may be reduced. As a permanent means of closing the indicating circuit the following apparatus comes into play.

It has already been pointed out that as soon as the pointer 73 contacts with the terminal 75 the circuit is closed through the relay 81. The armature 84 is drawn down permitting the contact 85 to fall on the point 86, thus permanently connecting the indicating device to the battery through the ground until the relay is reset and the member 85 raised by the resetting of armature 84.

The apparatus for indicating the minimum point of viscosity will now be described. The terminal 74 is connected by means of the lead 89 to the relay 90 which is in turn connected to the movable element 33 of the bellows by the lead 91 and contact point 92. The lead 91 is insulated from the casing 12. The meter is grounded at any suitable point such as 93. The lead 94 connects the lead 76 with the movable contact 95. The relay 90 is provided with the armature 96. The terminal 97 is connected to the ground 80 through the lead 98. The operation of this apparatus is as follows: When the viscosity of the liquid falls to the minimum value the pointer 73 swings over and contacts with the terminal 74 thus connecting the indicating device 77 to the battery 78 through the following circuit: Starting at the ground 80, through the lead 79, the battery 78, the indicating device 77, the lead 76, the pointer 73, the terminal 74, the lead 89, the relay 90, the lead 91, the terminal 92, and back to the ground 93. At the same time that the indicating device 77 is energized the relay 90 is also energized thus drawing down the armature 96 and permitting the terminal 95 to fall upon the contact point 97. The circuit for permanently closing the indicating device once the minimum value is attained is therefore traced as follows: Starting at the ground 80, we follow through the lead 79, the battery 78, the indicating device 77, the lead 76, to the lead 94, to the contact member 95, the terminal 97, the lead 98, and back to the ground at 80.

It will be understood, of course, that in actual operation of the device every time the meter stops functioning the pressure within the casing of the meter outside of the bellows will fall back to zero, thus causing the pointer 73 to pass over the minimum point. In order, therefore, to prevent the minimum reading mechanism from functioning when the meter is not in use the contact point 92 is provided to break the circuit of the relay 90 when the pressure within the bellows is reduced by the stopping of the instrument. It therefore follows that the minimum actuating mechanism will function only when there is sufficient pressure within the bellows to keep the member 33 in contact with the member 92 which is the condition obtaining only when the meter is in operation.

It will be understood that in the interest of economy a single signal device 77 is employed to indicate either a maximum or a minimum reading, as the case may be. In practice, this is generally sufficient, for the reason that once the signal is on, the operator knows there is a danger condition and he will then also know what the danger is or if he doesn't know accurately, he may trace the trouble down.

While we have disclosed herein a specific embodiment of an indicating apparatus it will be understood that the details of this indicating apparatus may be widely varied without departing from the spirit of this invention. Instead of utilizing an electrical indicating apparatus, any suitable maximum and minimum indicating apparatus comprising mechanical elements may also be used.

Referring now in detail to Fig. 2, there is herein disclosed a modification of the device shown in Fig. 1. The modification of Fig. 2 operates upon exactly the same principle as that of Fig. 1, the only essential difference being the use of the yieldable diaphragm 133 instead of the bellows 31 of Fig. 1. Fig. 2 will now be further described in detail, it being understood that the parts of this arrangement which correspond to the structure of the equivalent parts of Fig. 1 are designated by the same reference numerals in each figure. In the modification of Fig. 2 we have substantially altered the valve mechanism as follows:

In place of the valve stem 36 the projection 136 is attached to the diaphragm 133. The valve seat 21 is provided with a ball 130 which is held in position in the seat by a spring 140. The screw head 141 may be adjustably positioned interiorly of the valve casing 20 by screwing the same upwardly or downwardly to regulate the tension of the spring 140 upon the ball 130. The member 141 is provided with a passage 142 to permit the flow of liquid therethrough. It will thus be seen that the position of the valve seat with respect to the projection 136 is adjustable by means of the member 20, and also the tension upon the spring 140 is adjustable by means of the member 141.

The theory of operation of this modification is the same as that of the modification of Fig. 1 the yieldable diaphragm acting as the bellows to regulate the flow of liquid into the meter.

It will be also understood that the maximum and minimum indicating apparatus described in detail in connection with Fig. 1 may be applied to the modification of Fig. 2 in the same way, and also this indicating mechanism may be applied to the modification of Fig. 3, illustration of this apparatus in connection with Figs. 2 and 3 being omitted for the sake of simplicity.

Figure 6:
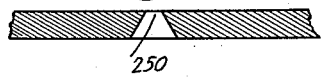

Turning now to Fig. 3 we find another modification of the device in which the valve and bellows structure is identical with that of the modification of Fig. 1. However, instead of providing the plate 33 of the bellows with an orifice, the orifice 250 is placed in the outlet pipe 200 and the shape of this orifice is shown in detail in Fig. 6. The orifice 250 departs from the ordinary accelerative non-frictional orifice of our aforesaid copending application in order to provide a pressure viscosity characteristic corresponding to that shown in Fig. 4 whereby to permit proper readings of viscosity within the range of commercial pressure gauges. The jet 70 configured in the same way as the jet 70 of Fig. 1 is used in combination with the orifice 250 and the gauge 71 is connected intermediate of the jet and the orifice. It will be noted that the exterior of the bellows 31 is open to the atmosphere and therefore any suitable standard 201 may be provided for supporting the same upon the plate 202. Also the supporting spring 60 as shown in Fig. 1 may be utilized in connection with the bellows 31 of Fig. 3 but it is thought that further illustration of this feature is not necessary to an understanding of the operation of the modification of Fig. 3. The liquid to be tested enters the conduit 26, passes through the valve 21 into the interior of the bellows 31. The pressure thus created actuates the valve mechanism thereby permitting the flow of liquid into the bellows. From the interior of the bellows 31 the liquid passes through the pipe 200 through the orifice 250 and the jet 70. The pressure reactions caused by the passage of the oil through the orifice 250 are indicated upon the gauge 71 which may be calibrated in units of viscosity.

It will be understood that in the modification of Figs. 1 to 3 inclusive, the flow of liquid out of the jet 70 should not be impeded but that the liquid should have a free fall from the jet to prevent the creation of a back pressure.

It will also be understood in connection with the modification of Fig. 1 that the interior of the casing comprised by the members 11 and 12 is much larger than would ordinarily be needed to handle the quantities of liquid to be tested. However, this increased volume, as compared to the volume of the bellows, is provided for the purpose of insuring the trapping of a small amount of air within the casing to act as a cushioning means to prevent vibration of the needle on the gauge 71 as was explained above. Also, the pipe leading from the casing to the gauge in actual practice should be arranged to have sufficient length so that there always will be a certain amount of frictional resistance introduced to help damp the gauge needle fluctuations. Also, the increased size of the casing affords a reservoir which permits circulation of a certain amount of the liquid to be tested before the device starts to indicate viscosity values, thus tending to compensate for the fact that residual oil in the feed lines, connections, and the meter itself is at a lower temperature than oil delivered directly from the oil pump.

In calibrating the instruments we have found it convenient to connect gauges to the interior of the bellows as well as the chamber surrounding the bellows using either two separate gauges or a single differential gauge. We are thus enabled to determine when the pressure difference between the inside and outside of the bellows, or the pressure difference above and below the diaphragm, is constant. The various adjustments for the valve and spring tension on the bellows or diaphragm may be made while the device is in operation. In order to permit adjustment of the valve stem 36 while the meter is in use we have devised a screw driver having a screw cap fitted to it. The screw cap 23 is removed and the screw cap carrying the screw driver is mounted in its place. The screw driver is slidable and turnable in the cap and adjustment of the stem 36 may thus be made while the meter is under pressure. It will be understood that the shank of the screw driver slides through the screw cap, but that these two elements are pressure tight in their fit.

It will be understood that it is within the purview of this invention to reverse the positions of the orifice and jets shown in Figs. 1 and 2, by mounting the jet in the bellows or diaphragm and the orifice in place of the jet.

Having thus described our invention, what we claim is:

1. A viscosity measuring device comprising in combination, a casing, an elastic means within said casing and defining therewith two chambers, a valve having a seat adjustably mounted in said first chamber, said valve having a movable closure, means carried by said elastic means for moving said closure, said elastic means being provided with an opening of predetermined dimensions, said second chamber being provided with an opening of predetermined dimensions, and a pressure indicating means connected to said second chamber.

2. A viscosity measuring device comprising in combination, a casing, an elastic means within said casing and defining therewith two chambers, means to vary the tension on said elastic means, said elastic means being provided with an opening, means connected to said elastic means and operable thereby for maintaining constant pressure drop through said opening, said second chamber being provided with an opening and means to indicate the reaction of the flow of liquid to be tested through said last mentioned opening.

3. A viscosity measuring device comprising in combination, a casing, an elastic means within said casing and defining therewith two chambers, a valve having a seat adjustably mounted in said first chamber, said valve having a movable closure, adjustable means carried by said elastic means for moving said closure, said elastic means being provided with an opening of predetermined dimensions, said second chamber being provided with an opening of predetermined dimensions, and a pressure indicating means connected to said second chamber.

4. In a viscosity measuring device, means including an orifice to maintain substantially constant the speed of flow of liquid to be measured, said orifice being shaped to offer resistance to flow therethrough which resistance has predetermined accelerative and frictional components in a predetermined ratio, a casing into which said liquid is fed at substantially constant speed, said casing being provided with an opening of predetermined dimensions, and said opening having a predominantly frictional resistance to the flow of liquid therethrough, and an indicating device connected to said casing.

5. In a viscosity measuring device, means including an orifice to maintain substantially constant the speed of flow of liquid to be measured, said orifice being shaped to offer resistance to flow therethrough which resistance has accelerative and frictional components in a predetermined ratio, a casing into which said liquid is fed at substantially constant speed, said casing being provided with a jet of predetermined dimensions, and said jet having a predominantly frictional resistance to the flow of liquid therethrough, and an indicating device connected to said casing.

6. A viscosity measuring device comprising in combination, a casing, an elastic means within said casing and defining therewith two chambers, a valve operable by said elastic means to control the flow of liquid into said first chamber, said elastic means being provided with an orifice having both a frictional and accelerative reaction to the flow of liquid therethrough, said second chamber being provided with a passage through which the liquid is adapted to flow having a predominantly frictional resistance, and means to indicate pressure changes in said second chamber.

7. A viscosity meter comprising in combination a casing, an elastic means within said casing and defining therewith two chambers, said elastic means having an opening therein, a conduit connected to said first chamber for conducting liquid at variable speed, means connected to said elastic means for controlling the speed of flow of liquid into said first chamber, the said opening being configured to offer substantially purely accelerative resistance to the flow of liquid therethrough for a predetermined range of viscosity, and to offer both accelerative and frictional resistance in a predetermined ratio when the liquid flowing is of another predetermined range, a tube having a restricted passage mounted in said second chamber, and a pressure gage connected to said last mentioned chamber.

HARVEY S. KONHEIM.
WALTER J. ALBERSHEIM.